Dec. 27, 1955    W. L. BULKLEY    2,728,410
THROTTLE VALVE FOR GASES CONTAINING FINELY DIVIDED SOLIDS
Filed Nov. 30, 1953    2 Sheets-Sheet 1
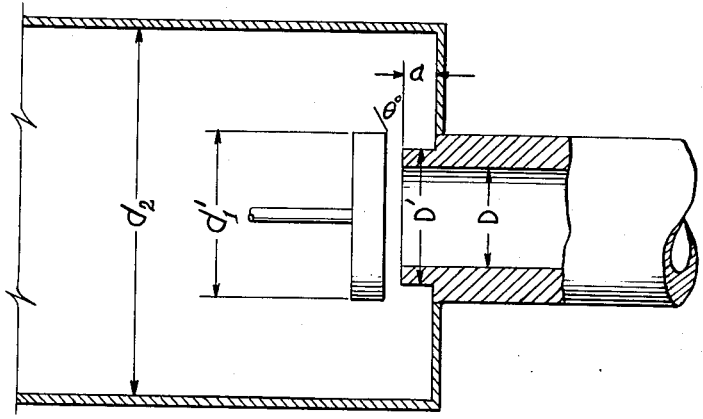
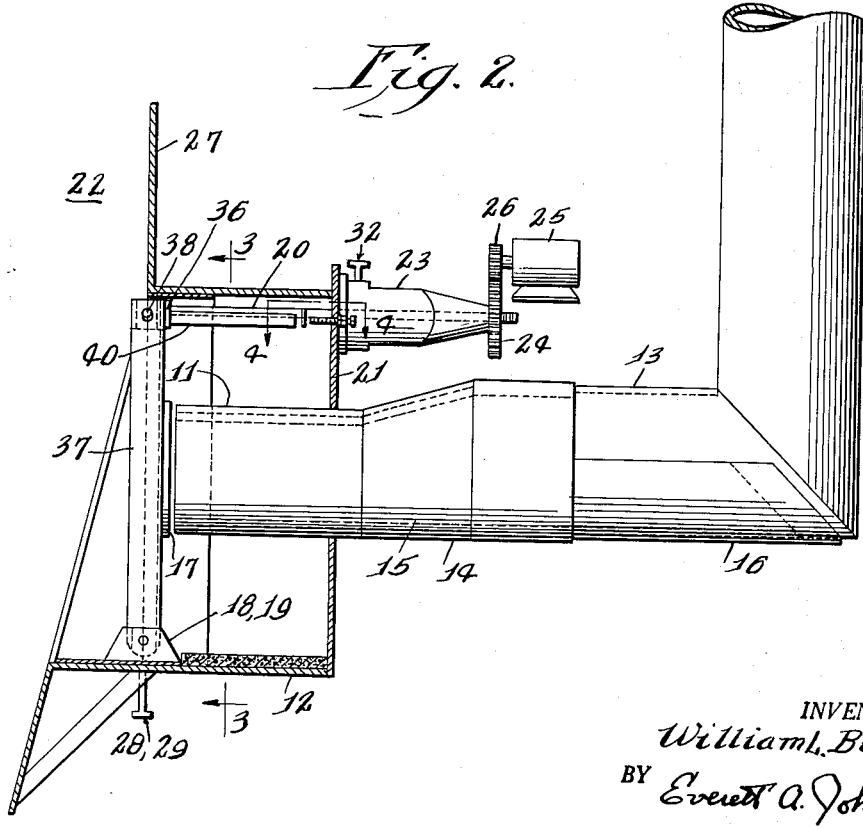
INVENTOR.
William L. Bulkley.
BY Everett A. Johnson
Attorney.

Dec. 27, 1955  W. L. BULKLEY  2,728,410
THROTTLE VALVE FOR GASES CONTAINING FINELY DIVIDED SOLIDS
Filed Nov. 30, 1953  2 Sheets-Sheet 2

INVENTOR.
William L. Buckley.
BY Everett A. Johnson
Attorney.

United States Patent Office 2,728,410
Patented Dec. 27, 1955

2,728,410

THROTTLE VALVE FOR GASES CONTAINING FINELY DIVIDED SOLIDS

William L. Bulkley, Munster, Ind., assignor to Standard Oil Company, Chicago, Ill., a corporation of Indiana Application November 30, 1953, Serial No. 395,232

3 Claims. (Cl. 183—40)

This invention relates to a valve construction and, more particularly, to a valve design which is wear resistant when used for throttling gases containing suspended solids.

Valves used for throttling gases containing suspended solids are subject to considerable erosion. The high wear rate of conventional butterfly and slide valves used in fluid catalytic conversion units has made such valves unsatisfactory in that service. For example, a butterfly type throttle valve handling a gas with entrained solids, such as a flue gas from a fluidized cracking catalyst unit being introduced into a catalyst separator, is subject to considerable erosion. The desired upstream pressure is maintained by adjusting the angular position of a valve disc. This results in excessive wear, not only of the valve disc but also of the valve housing. Accordingly, it has been necessary in such installations to repeatedly shut down the operation for the purpose of repairing the valve housing and for renewing the valve disc. Furthermore, butterfly type discs may not remain adjustable but have a tendency to freeze in the initial position and this makes it impossible to adjust for changes in operating conditions or to compensate for wear and the situation becomes progressively worse.

It is, therefore, a primary object of this invention to provide a throttle valve which is uniquely adapted to maintaining the desired upstream pressure and one which is wear resistant but which can be readily adjusted to compensate for any wear which might occur or for changes in operation. A further object of the invention is to provide a valve mechanism which is of rugged construction but simple to operate. An additional object is to provide a valve structure which can be readily installed in existing units and which can give long and trouble-free service on gas streams of varying suspended solids content. These and other objects of my invention will become apparent to those skilled in the art as the description thereof proceeds.

Briefly, I attain the objects of my invention by providing a valve structure wherein the wearing face of the adjustable plug is normal to the stream of suspended solids and is protected by a self-forming mat of solid particles. In addition, the sudden change in direction taken by the gas which suspended the solids causes the solids to move across the mat to be re-entrained by the gas. However, the solids move beyond the valve before being accelerated to a small fraction of the gas velocity. This continuously renewed protective mat reduces wear on the valve disc to a negligible amount. The valve disc is positioned at the end of a sleeve which comprises the outlet from the conduit being throttled. This end of the sleeve against which the disc seats is virtually free from wear because the solid particles are directed away from this surface by the centrifugal action of the direction change of the flowing gas. As a result, the entire valve, i. e., the valve seat and valve disc, has exceptionally long life.

The valve disc or face is made flat or slightly recessed in the direction of flow of the approaching suspended catalyst stream and the disc should have a diameter at least equal to the outside of the diameter of the sleeve against which it seats. If the plug face is shaped so that a portion may enter the sleeve, the flow introduced thereby attacks the plug and the sleeve so as to reduce the life of the valve assembly. Some reduction in the diameter of the disc may be accomplished by the use of a relatively thin sleeve liner projecting beyond the end of the sleeve. The pressure drop characteristics of such a valve assembly remain constant for long periods whereas the rapid wear of the conventional types of valves affects their characteristics adversely.

Other advantages of my valve design and the details of construction will be described with reference to the accompanying drawings wherein:

Figure 1 is a schematic illustration of the inlet duct and valve plug according to this invention;

Figure 2 is an elevation, partly in section, illustrating a typical installation employing this principle;

Referring to Figure 1, the relative dimensions of the plug 10 and duct 11 are illustrated. The maximum and minimum dimensions are illustrated in Table I below.

Table I

| Dimension | Minimum | Maximum |
|---|---|---|
| $d_1$ | 5/4D or D+2″ Whichever is smaller. | 3/4$d_2$ or 3/2D Whichever is smaller. |
| $d_2$ | 2D | ∞ |
| $D^1$ | 5/4D or D+1″ Whichever is smaller. | $d_1$. |
| $a$ | 1/2D or 3″ Whichever is smaller. | ∞ |
| $\theta$ | 0° | 5° (Less if required to get proper pressure drop). |

Figure 3:
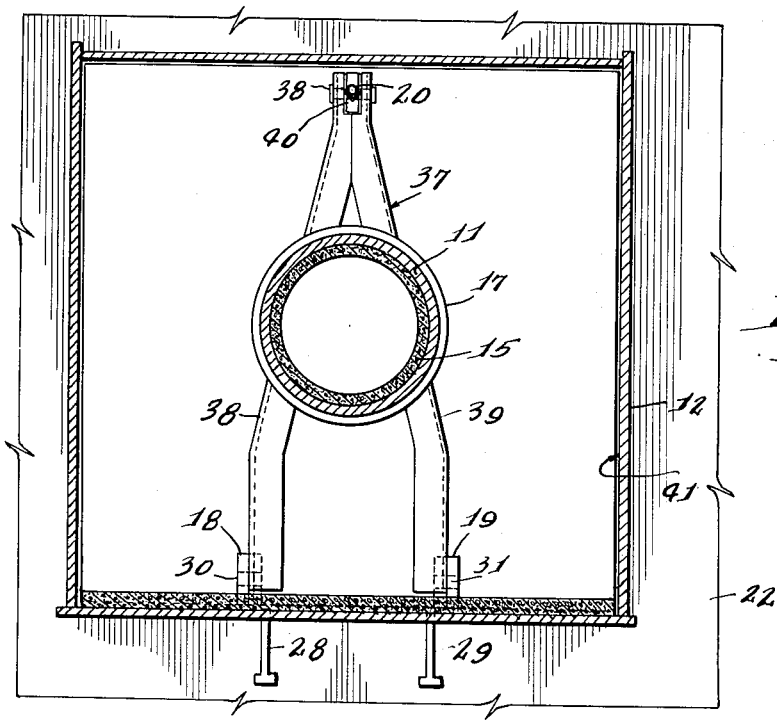
Figure 3 is a section taken along the line 3—3 in Figure 2.
Figure 4:
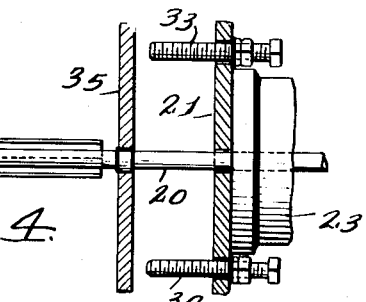
Figure 4 is a section taken along the line 4—4 in Figure 2.

In Figures 2, 3 and 4, the gas stream containing the suspended solids flow by line 13 through a reducer section 14 which terminates in duct 11 extending within the valve housing 12. The line or duct 13 and reducer section 14 may all be provided with an erosion resistant lining 15. Likewise, at the bend in the line 13 an exterior re-enforcing boot 16 can be provided.

The valve plug or plate 17 is supported by the hinged A-frame 37 which is pivoted at its base to blocks 18 and 19. The upper end of the A-frame is pivotally and adjustably pinned to the rod 20 which passes through the front wall 21 of the valve housing 12 carried by the catalyst separation chamber 22. The rod 20 passes through a gland 23, and a gear 24 is fixed to the rod 20 exterior of the gland 23. A motor 25 and a drive gear 26 rotates the gear 24 and hence the valve operating rod 20. The valve plate 17 is adjusted adjacent the outlet of the duct 11 in a manner illustrated by and described in connection with Figure 1. Expansion in the duct or line 13 is taken up by the flexure of the front wall 21 of the box or housing 12 which is fixed to the wall 27 of the catalyst separator 22. Aeration nozzles 28 and 29 keep the pin joints 30 and 31 free of catalyst. Another aeration duct 32 is introduced into the gland chamber 23 to keep the adjusting rod 20 free of catalyst and, therefore, non-binding.

To prevent complete valve closure in the event of the failure of the valve operator (motor 25, gear 24 and gear 26), a stop means is provided on the operating rod 20 as illustrated in Figure 4. This will prevent the complete closing of the valve by the inadvertent drawing of the valve plate 17 up against the outlet of the duct 13. Adjusting bolts 33 and 34 are fixed to the front wall 21 of the housing 12 on either side of the gland chamber 23.

The adjustable stops or bolts 33 and 34 are extended through the front wall 21 a suitable distance so that the ends thereof will engage the stop plate 35, carried by the operating rod 20 before the valve disc 17 can completely close the outlet to the duct 13.

Referring to Figure 3, the A-frame 37 comprises a pair of symmetrical legs 39 and 38 which may suitably be formed of angle iron and hinged at the lower ends by pins 30 and 31 to the blocks 18 and 19. At the upper end of the A-frame 37 these legs 38 and 39 merge and are fixed as by welding. Pin 38 journals the top of the A-frame 37 to block 36 to which is attached the operating rod 20. A deflector 40 comprises a length of angle iron below the operating rod 20 and moves with the A-frame 37 and rod 20. The plate or disc 17 is fixed across the converging legs 38 and 39 of the A-frame 37 so as to throttle the flow from the duct 11.

As described above, the catalyst particles are thrown by centrifugal force across the face of the valve plug 17 and to minimize erosion of the valve housing or box 12 and to minimize erosion of the operating rod 20, the peripheral internal shoe 41 is welded within box 12 and the catalyst deflector 40 is disposed below the operating rod 20. Also, an erosion resistant lining 15 can be provided across the bottom of the valve housing 12.

Figure 5:
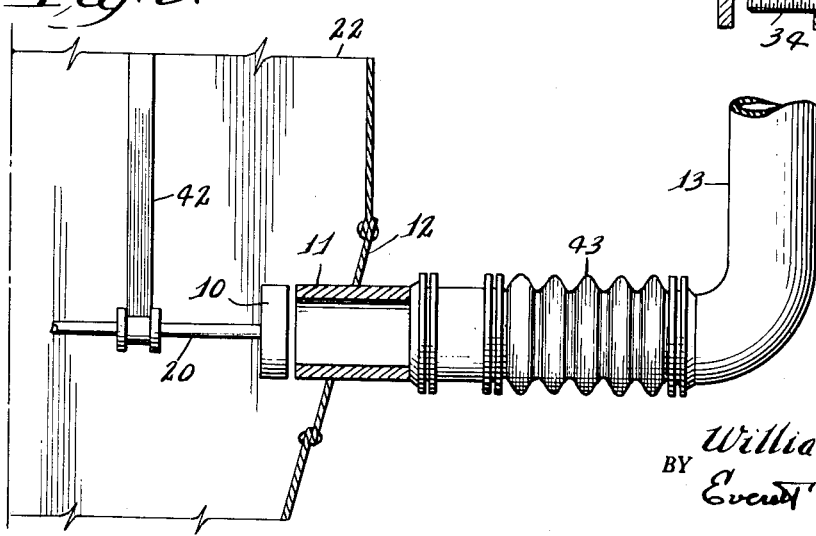
Figure 5 represents a simplified installation also employing the principles illustrated by Figure 1.

Another embodiment of the invention is illustrated in Figure 5 wherein the terminal duct 11 on the flow line 13 passes through the wall of the catalyst separator 22 where it is rigidly fixed. The plug 10 and the plug operating rod 20 are moved axially of the duct 11 through a bearing support on hanger 42. Rod 20 is operated in a manner similar to that described in connection with Figure 2. Expansion in the line 13 introducing the catalyst suspension is taken up by the bellows 43 whereas in the embodiment of Figure 2 the front wall 21 of the box or housing 12 flexes to take up the line expansion.

In a typical installation, the inlet line 13 may be about 26 inches O. D. with the reducer section 14 bringing the line to about 22 inches O. D. at the terminal duct 11. The valve plate 17 may be about 24 inches in diameter by 1.5 inches thick and welded to the front of the A-frame 37. The legs 38 and 39 of the A-frame 37 may comprise 4 by 6 by ½ inch angle irons whereas the catalyst deflector 40 may be a 2 by 2 angle iron.

The valve plate 17 can be constructed of a carbon steel plate or such a plate faced with a suitable material which confers additional erosion resistance. For example, I may apply a hard facing of tungsten carbide particles in weld metal as a binder. In such an arrangement, the binder is preferentially eroded creating interstices between the tungsten carbide particles which serve to anchor the initial layer of catalyst particles and thereby assist in forming the mat described above.

In another embodiment, the valve plate 17 may be made of sintered, powdered, stainless steel or other suitable metal. Such a plate or plug 17 may be initially somewhat gas-pervious permitting flow therethrough and causing the catalyst particles to be trapped on the exposed wearing surface. One such porous metal material is stainless steel powder which has been sintered to produce a coherent mass which has interstices not larger than about 45 microns in diameter. A material of this grade is capable of stopping a majority of catalyst particles of 5 to 20 microns. When the initial layer has been formed, the mat builds up as described herein.

In addition to providing the solids entrapping surfaces described above, I may provide the wearing surface with a slightly concave face and, in some instances, a circular recess in the wearing face will serve to collect a mass of catalyst which forms the protective mat.

The end of the duct 11 extends into the box 12 a distance of about 20 to 24 inches and the outer periphery is spaced about 24 to 26 inches from the side walls of the box 12. The valve plate 17 moves about the pins 30 and 31 on a radius of about 36 inches and the valve movement with respect to the duct 11 is normally less than about 1°, but this spacing is determined by the required pressure drop through the throttle valve. The slight angularity of the valve plate 17 and the end of the line 13 introduced by the use of the lever action of the A-frame 37 does not introduce any serious erosion problem with small angles of less than 5°. Ordinarily, however, I prefer to maintain the angle at less than about 2°.

From the above, it will be apparent that I have provided an apparatus which may be used in the method of throttling a gas-solids stream from a high pressure to a low pressure with a minimum amount of erosion. In the system, the gas-solids stream is caused to flow in a substantially straight line and to impinge upon a wear resistant surface arranged substantially normal to the flow of the gas-solids stream. After short operation, gases and solids are continuously separated at the surface and the solids accumulated to form a mat thereover. Catalyst particles in said mat slowly move outwardly of the valve surface by continuously displacing solids with additional and subsequently separated solids. The gases of decreased solids content are deflected in a direction substantially normal to the flow of the stream and solids emerging from the periphery of the mat are resuspended with a subsequent portion of the gases. By this means erosion of the valve surface upon which the solids have been caused to accumulate is substantially minimized and the gas-solids stream is introduced into a gas-solids separator at substantially reduced pressure.

Although I have described my invention with reference to particular embodiments thereof which have been set forth in some detail, it should be understood that these are by way of illustration only and that the invention is not necessarily limited thereto. Accordingly, it is contemplated that alternative embodiments of the apparatus and of the operating techniques will become apparent to those skilled in the art in view of the foregoing and that modifications will be made without departing from the spirit of the described invention.

What I claim is:

1. A throttle valve apparatus for use in introducing a gas stream having entrained solids into a low pressure solids separator which comprises in combination a gas-solids transfer line, a solids separator chamber, a valve control housing carried by said chamber and exterior thereof, a front wall on said housing, a terminal end of said transfer line extending through said front wall, a valve plate in said housing arranged substantially normal to the flow through said terminal end, an adjustable support for said valve plate, said valve plate having a substantially flat wearing face which is substantially normal to the flow of the gas-solids stream from said transfer line, whereby a mat of solid particles is continuously formed on said wearing face, said mat protecting the wearing face from erosion by subsequently impinging solids.

2. A throttling valve apparatus for use in handling gasiform streams containing suspended solids which comprises in combination a solids separation chamber, a valve control housing fixed to a wall of said chamber and extending exteriorly thereof, a deformable wall on said housing, said deformable wall supporting the terminal end of a transfer conduit, said conduit extending a substantial distance within said housing through said wall, a valve plate adjustably supported across the discharge end of said conduit within said housing, an adjustable support frame for said valve plate, a fixed hinge at one end of said frame, an adjustable control rod pivotally fixed to the other end of said frame, stop means fixed to said rod adjacent to said deformable wall, and an adjustable stop-contacting means fixed to said wall and extending inwardly thereof to limit the closing of said valve plate upon movement of said control rod so that complete closing of the discharge end of the conduit is not possible.

3. A throttle valve apparatus for use in introducing a gas stream having entrained solids into a low pressure solids separator which comprises in combination a gas-solids transfer line, a solids separator chamber means, a housing having a diameter of at least twice the diameter of said line and communicating with said chamber means, a terminal end of said transfer line extending through a wall portion of said housing a distance greater than the smaller of about 3 inches and about one-half the internal diameter of said line, a valve plate in said chamber means arranged substantially normal to the flow of the gas-solids stream from said line through said terminal end, an adjustable support for said valve plate, said valve plate having a substantially flat wearing face with a lateral dimension which is at least equal to the sum of a length corresponding to the internal diameter of said line plus the smaller of 2 inches and of 25% of said internal diameter, whereby a mat of solid particles may continuously form on said wearing face, said mat protecting the wearing face from erosion by subsequently impinging solids.

References Cited in the file of this patent

UNITED STATES PATENTS

| | | |
|---|---|---|
| 982,488 | Gamble | Jan. 24, 1911 |
| 1,094,204 | Elliot | Apr. 21, 1914 |
| 2,136,476 | Thomas | Nov. 15, 1938 |

FOREIGN PATENTS

| | | |
|---|---|---|
| 553,772 | France | May 30, 1923 |